United States Patent
Lowenberg et al.

(10) Patent No.: US 10,552,836 B2
(45) Date of Patent: Feb. 4, 2020

(54) METHOD AND SYSTEM FOR IDENTIFICATION OF SHARED DEVICES FOR FRAUD MODELING

(71) Applicant: MasterCard International Incorporated, Purchase, NY (US)

(72) Inventors: Todd Christian Lowenberg, Redding, CT (US); Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 591 days.

(21) Appl. No.: 15/290,211

(22) Filed: Oct. 11, 2016

(65) Prior Publication Data
US 2018/0101851 A1 Apr. 12, 2018

(51) Int. Cl.
  *G06Q 40/00* (2012.01)
  *G06Q 20/40* (2012.01)
  *H04L 29/06* (2006.01)

(52) U.S. Cl.
  CPC ...... *G06Q 20/4016* (2013.01); *H04L 63/0428* (2013.01); *H04L 2209/16* (2013.01); *H04L 2209/56* (2013.01)

(58) Field of Classification Search
  CPC ... G06Q 40/00; H04L 63/102; H04L 63/0428; H04L 2209/16; H04L 2209/56; H04L 2463/102
  See application file for complete search history.

(56) References Cited

U.S. PATENT DOCUMENTS

| | | | | |
|---|---|---|---|---|
| 7,707,089 B1* | 4/2010 | Barton | ......... | G06Q 20/10 235/380 |
| 8,788,420 B1* | 7/2014 | Green | ......... | G06Q 20/4016 705/44 |
| 10,049,349 B1* | 8/2018 | Grassadonia | ......... | G06Q 20/10 |
| 2003/0140004 A1* | 7/2003 | O'Leary | ......... | G06Q 20/04 705/39 |
| 2007/0228148 A1* | 10/2007 | Rable | ......... | G06Q 20/10 235/379 |

(Continued)

OTHER PUBLICATIONS

Banking on TechnologyWall Street & Technology: 76. CMP Media, Inc. (Apr. 1993) (Year: 1993).*

*Primary Examiner* — Lalita M Hamilton
(74) *Attorney, Agent, or Firm* — Buchanan Ingersoll & Rooney PC (57) ABSTRACT

A method for fraud modeling based on shared computing device usage includes: storing transaction data entries, each including a transaction date and/or time, account identifier, and device identifier associated with a computing device; receiving a transaction message for a payment transaction, the transaction message including a specific device identifier, primary account number, and additional transaction data; identifying transaction data entries where the included device identifier corresponds to the specific device identifier; determining a fraud risk rating based on a number of unique account identifiers included in the identified transaction data entries over a predetermined period of time; and transmitting the transaction message and the determined fraud risk rating to a financial institution associated with the primary account number.

20 Claims, 6 Drawing Sheets

(56) References Cited

U.S. PATENT DOCUMENTS

| | | | |
|---|---|---|---|
| 2009/0222369 A1* | 9/2009 | Zoldi | G06Q 10/10 |
| | | | 705/35 |
| 2012/0278193 A1* | 11/2012 | Groat | G06Q 20/20 |
| | | | 705/26.1 |
| 2015/0106265 A1* | 4/2015 | Stubblefield | G06Q 50/265 |
| | | | 705/44 |
| 2018/0005243 A1* | 1/2018 | Zovi | G06Q 20/4016 |
| 2018/0053189 A1* | 2/2018 | Monk | G06Q 20/123 |
| 2018/0096351 A1* | 4/2018 | Dahn | G06Q 20/405 |

* cited by examiner

METHOD AND SYSTEM FOR IDENTIFICATION OF SHARED DEVICES FOR FRAUD MODELING

FIELD

The present disclosure relates to the identification of fraud risk ratings for an electronic transaction based on an associated computing device, specifically the identification of the past transaction history for the computing device to identify the number of transaction accounts that have used that computing device for use in fraud modeling and determinations regarding likelihood of risk.

BACKGROUND

The use of computing devices by consumers to initiate and carry out payment transactions has greatly increased over time. In many instances, consumers may elect to purchase products using their desktop computer, tablet computer, smart phone, television, or other computing device. The use of a computing device can provide a number of benefits, such as convenience by not having to travel to a merchant's physical location, accessibility for products that may not be locally available to the consumer, or anonymity with regards to the product being purchased and the consumer behind the purchase, such as may be beneficial in the purchasing of surprise gifts.

However, while anonymity and convenience may be beneficial for genuine consumers, the anonymity provided by using a computing device to initiate and carry out a payment transaction may be taken advantage of by nefarious parties wishing to engage in fraud. In such cases, the fraudster may often choose a computing device that is public or otherwise shared among a large number of users that may conduct payment transactions, such as at a public library, Internet café, etc. As a result, it may be more difficult for the fraudster to be detected and differentiated among the large number of users. Accordingly, payment transactions conducted using public or shared computing devices may be at a greater risk for fraud.

However, there is currently a lack of methods available to payment networks, merchants, and financial institutions in detecting when a computing device used in a payment transaction may be public or otherwise shared by a large number of users. Instead, many financial institutions attempt to increase their ability to identify the consumer behind the transaction as an authorized user of the transaction account being used, such as by the use of one-time passwords, security questions, and other authentication mechanisms. Unfortunately, such methods only seek to authenticate the user themselves, and do not identify the usage of the underlying computing device.

Thus, there is a need for a technical solution to identify the number of transaction accounts and/or users associated with a computing device for use in fraud modeling for an attempted payment transaction.

SUMMARY

The present disclosure provides a description of systems and methods for fraud modeling based on shared computing device usage. Such a technological solution as discussed herein may provide for more accurate determinations regarding the likelihood of fraud of a payment transaction, without requiring a consumer to provide additional information by way of authentication and thus maintaining a high level of consumer convenience while protecting account security.

A method for fraud modeling based on shared computing device usage includes: storing, in a transaction database of a processing server, a plurality of transaction data entries, wherein each transaction data entry is a structured data set related to a payment transaction including at least a transaction date and/or time, an account identifier, and a device identifier associated with a computing device involved in the related payment transaction; receiving, by a receiving device of the processing server, a transaction message for a payment transaction, wherein the transaction message is formatted based on one or more standards and includes at least a plurality of data elements including at least a first data element configured to store a specific device identifier, a second data element configured to store a primary account number, and one or more additional data elements configured to store additional transaction data; executing, by a querying module of the processing server, a query on the transaction database to identify one or more transaction data entries where the included device identifier corresponds to the specific device identifier stored in the first data element included in the received transaction message; determining, by a determination module of the processing server, a fraud risk rating based on at least a number of unique account identifiers included in the identified one or more transaction data entries over a predetermined period of time and the primary account number stored in the second data element included in the received transaction message; and electronically transmitting, by a transmitting device of the processing server, at least the received transaction message and the determined fraud risk rating to a financial institution associated with the primary account number stored in the second data element included in the received transaction message.

A system for fraud modeling based on shared computing device usage includes: a transaction database of a processing server configured to store a plurality of transaction data entries, wherein each transaction data entry is a structured data set related to a payment transaction including at least a transaction date and/or time, an account identifier, and a device identifier associated with a computing device involved in the related payment transaction; a receiving device of the processing server configured to receive a transaction message for a payment transaction, wherein the transaction message is formatted based on one or more standards and includes at least a plurality of data elements including at least a first data element configured to store a specific device identifier, a second data element configured to store a primary account number, and one or more additional data elements configured to store additional transaction data; a querying module of the processing server configured to execute a query on the transaction database to identify one or more transaction data entries where the included device identifier corresponds to the specific device identifier stored in the first data element included in the received transaction message; a determination module of the processing server configured to determine a fraud risk rating based on at least a number of unique account identifiers included in the identified one or more transaction data entries over a predetermined period of time and the primary account number stored in the second data element included in the received transaction message; and a transmitting device of the processing server configured to electronically transmit at least the received transaction message and the determined fraud risk rating to a financial institution associated with the primary account number stored in the second data element included in the received transaction message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Fraud Modeling Based on Computing Device Usage

Figure 1:
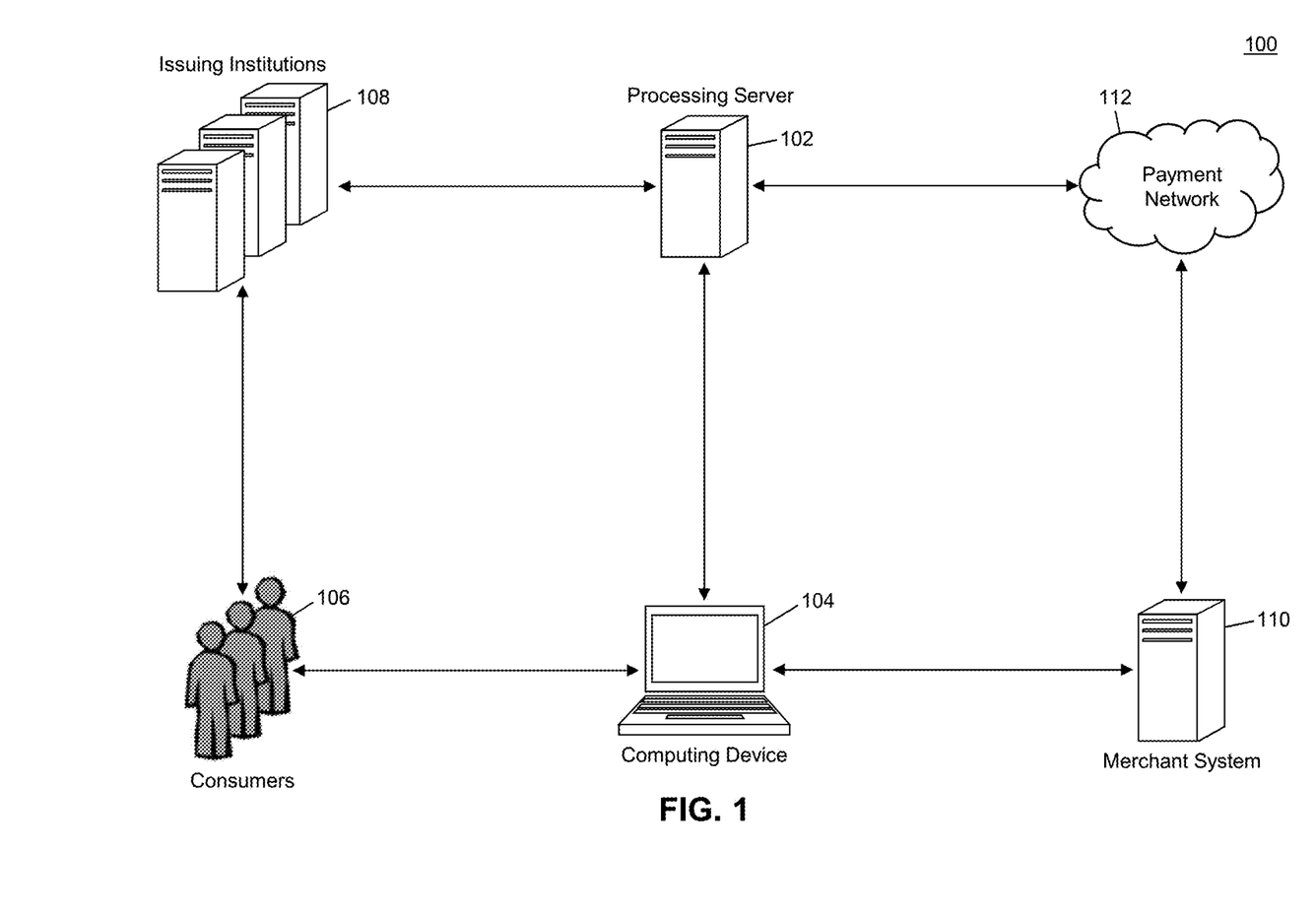
FIG. 1 is a block diagram illustrating a high level system architecture for fraud modeling payment transactions based on computing device usage in accordance with exemplary embodiments.

FIG. 1 illustrates a system 100 for the use of fraud modeling to identify a fraud risk rating for a payment transaction that is based on at least the usage of multiple transaction accounts for payment transactions involving a single computing device.

The system 100 may include a processing server 102. The processing server 102, discussed in more detail below, may be configured to identify fraud risk ratings and use fraud modeling based on the usage of a computing device 104 across multiple payment transactions. The computing device 104 may be used by one or more consumers 106 to conduct payment transactions. Each consumer 106 may have a transaction account associated therewith, issued to the consumer 106 by an issuing institution 108. The issuing institution 108 may be a financial institution, such as an issuing bank, or other entity configured to issue transaction accounts for use in funding payment transactions.

An issuing institution 108 may issue a transaction account to a consumer 106. The consumer 106 may then use the transaction account to fund a payment transaction that is initiated with the computing device 104. Each payment transaction may be initiated with a merchant via an associated merchant system 110. The consumer 106 may be configured to input or facilitate the input of the payment credentials for the transaction account into the computing device 104. In some instances, the consumer 106 may manually input payment credentials, such as a primary account number, expiration date, security code, cardholder name, etc., in the computing device 104 using one or more input devices, such as a keyboard. In other instances, the consumer 106 may instruct the issuing institution 108 to provision the payment credentials directly to the computing device 104 using a suitable provisioning method.

In some embodiments, the payment transaction may be an e-commerce transaction, such as may be conducted via the Internet, a cellular communication network, or other suitable type of communication network. In such embodiments, the computing device 104 may be configured to electronically transmit payment credentials associated with the transaction account to the merchant system 100 via the communication network, such as using a web site, application program, etc. In other embodiments, the payment transaction may be an in-person transaction where the consumer 106 is at a physical location of the merchant. In such embodiments, the computing device 104 may convey the payment credentials to the merchant system 110 using a suitable method, such as electronic transmission via near field communication, display of a machine-readable code encoded with the payment credentials, etc.

The computing device 104 may convey the payment credentials to the merchant system 110 along with a device identifier associated with the computing device 104. The device identifier may be a unique value associated with the computing device 104 suitable for use in the identification thereof. The device identifier may be, for example, a media access control address, internet protocol address, registration number, serial number, etc. The payment credentials and device identifier may be electronically transmitted to the merchant system 110 using the suitable communication network. The merchant system 110 may then electronically transmit the payment credentials, device identifier, and any other transaction data to the payment network 112. In some embodiments, the data may be electronically submitted directly to the payment network 112 via payment rails associated therewith. In other embodiments, the data may be electronically transmitted through one or more intermediate entities, such as an acquiring institution and/or gateway processor.

In some embodiments, the data may be formatted in a transaction message by the merchant system 110 or an intermediate entity. The transaction message may be a specially formatted data message formatted pursuant to one or more standards governing the exchange of financial transaction messages, such as the International Organization of Standardization's ISO 8583 or ISO 20022 standards. Each transaction message may include a message type indicator indicative of a type of the transaction message. Each transaction message may also include a plurality of data elements, where each data element stores transaction data for the payment transaction, such as the payment credentials, device identifier, etc. In some embodiments, a transaction message may also include one or more bitmaps, where each bitmap indicates the data elements included in the transaction message and the data stored therein.

The payment network 112 may receive the transaction message and may forward the transaction message to the processing server 102. In some embodiments, the processing server 102 may be external to the payment network 112, and may receive the transaction message via external communication methods, such as using the payment rails associated with the payment network 112. In other embodiments, the processing server 102 may be a part of the payment network 112, and may receive the transaction message via internal communication methods, such as a local area network of the payment network 112. The processing server 102 may determine a fraud risk rating for the payment transaction, based on the computing device 104 used in the payment transaction and past usage of the computing device 104 across other payment transactions.

The processing server 102 may be configured to store a transaction database, discussed in more detail below, comprised of data for a plurality of past payment transactions. The data for each past payment transaction may include at least the primary account number or corresponding account identifier for the transaction account used to fund the payment transaction, a device identifier for the computing device 104 used to initiate the payment transaction, and a date and/or time of the payment transaction. In some instances, the data may also include additional transaction data included in a transaction message received for the related payment transaction, such as a transaction amount, geographic location, merchant category code, merchant identifier, merchant data, consumer data, issuer data, acquirer data, product data, offer data, loyalty data, reward data, etc.

When the transaction message for a new payment transaction is received, the processing server 102 may identify the past payment transactions that were initiated using the same computing device 104 based on a correspondence with the device identifier included in a corresponding data element in the transaction message. The processing server 102 may then determine a fraud risk rating for the payment transaction that is based on at least the number of transaction accounts that have used the computing device 104 in prior payment transactions, as indicated via the identified past payment transactions. In some instances, the determination may take into account the date and/or time of the prior payment transactions. For example, the risk may be greater if a higher number of transaction accounts are used in a shorter period of time, which may indicate a public or shared computing device 104. In another example, if several different transaction accounts are used, but over a significant period of time, such as where each transaction account is the only one used for several weeks until a new one is used. In such an example, it may indicate the rotating usage of different transaction accounts by a single consumer 106, or the transfer of ownership or possession of the computing device 104 among consumers 106. In some embodiments, the fraud risk rating may take into account additional determinations regarding the potential for fraud, such as geographic location, transaction amount, transaction frequency, and other traditional fraud risk factors that will be apparent to persons having skill in the relevant art.

The processing server 102 may then forward the transaction message and the fraud risk rating to the issuing institution 108 associated with the transaction account used in the payment transaction. In some embodiments, the fraud risk rating may be stored in a data element included in the transaction message prior to transmission of the transaction message. The issuing institution 108 may then authorize or decline the payment transaction based on the fraud risk rating and traditional factors, such as the transaction amount and the transaction account's current balance and/or available credit, etc. The issuing institution 108 may return an authorization response for the payment transaction to the payment network 112 (e.g., via the processing server 102, if applicable), which may continue processing the payment transaction using traditional methods. The payment network 112 may return a response indicating approval or denial to the merchant system 110, which may then finalize the payment transaction. Additional information regarding the traditional processing of payment transactions is discussed in more detail below with respect to the process 500 illustrated in FIG. 5.

In some embodiments, the processing server 102 may be configured to tokenize transaction data prior to storage for use in performing the functions discussed herein. In such embodiments, the processing server 102 may tokenize the device identifier and/or primary account number prior to storage of the transaction data parsed from a transaction message in the transaction database. In some cases, tokenization may comprise the encrypting of the device identifier or primary account number, as applicable, using a suitable encryption algorithm. In other cases, tokenization may comprise the identification of a corresponding tokenized value via a look-up table or other similar method. In some instances, a one-way tokenization may be used such that the corresponding device identifier or primary account number may not be identified using the tokenized value, such as via the hashing of the device identifier or primary account number using a suitable hashing algorithm.

The methods and systems discussed herein enable the processing server 102 to utilize the usage of a computing device 104 in multiple payment transactions in fraud determinations. The use of a unique device identifier associated with the computing device 104 may enable the processing server 102 to keep track of payment transactions that involve the computing device 104, while also identify the number and frequency of transaction accounts that are used in the payment transactions. As a result, the processing server 102 may provide a more accurate assessment of the fraud risk of a payment transaction without requiring consumers 106 to provide additional authentication information, thus providing greater account security while maintaining consumer convenience via the technological solution.

Processing Server

Figure 2:
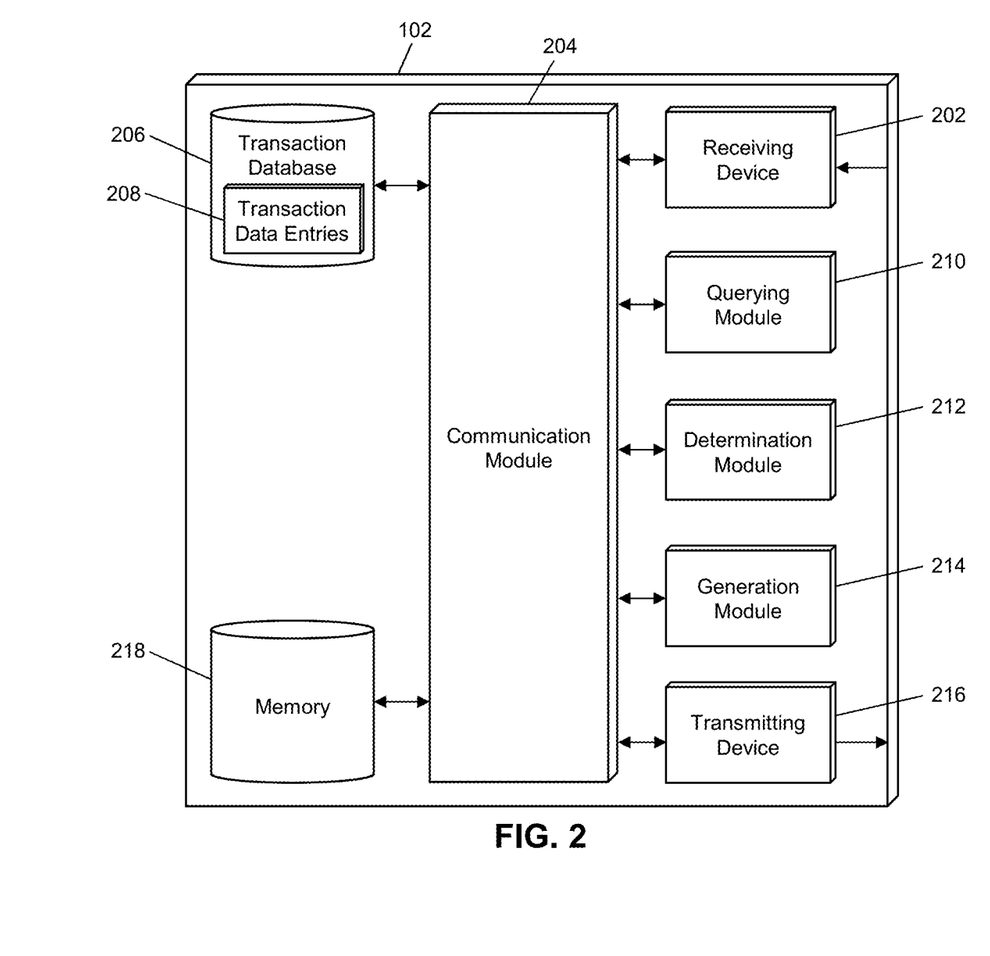
FIG. 2 is a block diagram illustrating the processing server of FIG. 1 for the determination of fraud risk for payment transactions based on computing device usage in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from computing devices 104, issuing institutions 108, merchant systems 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 112 via payment rails associated therewith that may be superimposed or otherwise encoded with transaction messages. Transaction messages may be formatted pursuant to one or more standards, such as the ISO 8583 or 20022 standards, and include a message type indicator and a plurality of data elements, such as data elements configured to store primary account numbers, device identifiers, and other transaction data, such as transaction amounts, transaction times, transaction dates, geographic locations, merchant data, product data, etc. The receiving device 202 may also be configured to receive data signals electronically transmitted by issuing institutions 108 that may be superimposed or otherwise encoded with transaction messages, such as authorization responses for payment transactions that indicate approval or denial of the payment transaction.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, determination module 212, generation module 214, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a transaction database 206. The transaction database 206 may be configured to store a plurality of transaction data entries 208 using a suitable data storage format and schema. The transaction database 206 may be a relational database that utilizes structured query language for the storage, identification, modifying, updating, accessing, etc. of structured data sets stored therein. Each transaction data entry 208 may be a structured data set configured to store data related to a payment transaction. Each transaction data entry 208 may include at least a transaction date and/or time, a primary account number (e.g., or corresponding account identifier or tokenized value), and a device identifier that may or may not be tokenized. In some embodiments, a transaction data entry 208 may include additional transaction data for the related payment transaction, such as the transaction amount, geographic location, merchant category code, etc.

The processing server 102 may include a querying module 210. The querying module 210 may be configured to execute queries on databases to identify information. The querying module 210 may receive one or more data values or query strings, and may execute a query string based thereon on an indicated database, such as the transaction database 206, to identify information stored therein. The querying module 210 may then output the identified information to an appropriate engine or module of the processing server 102 as necessary. The querying module 210 may, for example, execute a query on the transaction database 206 to identify transaction data entries 208 for payment transactions involving the computing device 104 used in a payment transaction for which a transaction message is received (e.g., by the receiving device 202) based on the device identifier stored therein.

The processing server 102 may also include a determination module 212. The determination module 212 may be configured to determine a fraud risk rating for a payment transaction based on usage of the computing device 104 in other payment transactions, specifically the use of other transaction accounts in payment transactions involving the computing device 104. The determination module 212 may receive an authorization request as input, may determine the fraud risk rating for the payment transaction based on the data included in the authorization request and the transaction database 206, and may output the determination to another module or engine of the processing server 102. The determination module 212 may be configured to instruct the querying module 210 to execute a query on the transaction database 206 to identify transaction data entries 208 that involve the same computing device 104, and then to determine the fraud risk rating depending on the number of transaction accounts that used the computing device 104 over a predetermined period of time.

In some embodiments, the processing server 102 may also include a generation module 214. The generation module 214 may be configured to receive an instruction, may generate data based on that instruction, and output the generated data to another module or engine of the processing server 102. The generation module 214 may, for example, be configured to generate a tokenized value of a device identifier or primary account number. In such instances, the generation module 214 may be configured to encrypt the device identifier or primary account number using a suitable encryption algorithm, which may include the usage of one or more encryption keys. In some cases, the generation module 214 may be configured to identify a data value corresponding to a device identifier or primary account number using a look-up table. For instance, the processing server 102 may store a table of correspondences between primary account numbers and/or device identifiers and tokenized values.

The processing server 102 may also include a transmitting device 216. The transmitting device 216 may be configured to transmit data over one or more networks via one or more network protocols. In some embodiments, the transmitting device 216 may be configured to transmit data over the payment rails, such as using specially configured infrastructure associated with payment networks 112 for the transmission of transaction messages that include sensitive financial data and information, such as identified payment credentials. In some instances, the transmitting device 216 may be configured to transmit data to computing devices 104, issuing institutions 108, merchant systems 110, payment networks 112, and other entities via alternative networks, such as the Internet. In some embodiments, the transmitting device 216 may be comprised of multiple devices, such as different transmitting devices for transmitting data over different networks, such as a first transmitting device for transmitting data over the payment rails and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to issuing institutions 108 and payment networks 112 that are superimposed or otherwise encoded with transaction messages. The transaction messages may be formatted pursuant to one or more standards, such as the ISO 8583 and ISO 20022 standards. The transaction messages may be authorization requests or authorization responses, and include a plurality of data elements including data elements configured to store primary account numbers, device identifiers, transaction dates and/or times, etc. In some instances, transaction messages electronically transmitted by the transmitting device 216 may include a data element configured to store a fraud risk rating, such as determined by the determination module 212. In other instances, the transmitting device 216 may be configured to electronically transmit data signals to the issuing institutions 108 superimposed or otherwise encoded with determined fraud risk ratings, such as may accompany electronically transmitted transaction messages.

The processing server 102 may also include a memory 218. The memory 218 may be configured to store data for use by the processing server 102 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 218 may be comprised of or may otherwise include a relational database that utilizes structured query language for the storage, identification, modifying, updating, accessing, etc. of structured data sets stored therein.

Process for Determining a Fraud Risk Rating Based on Computing Device Usage

Figure 3:
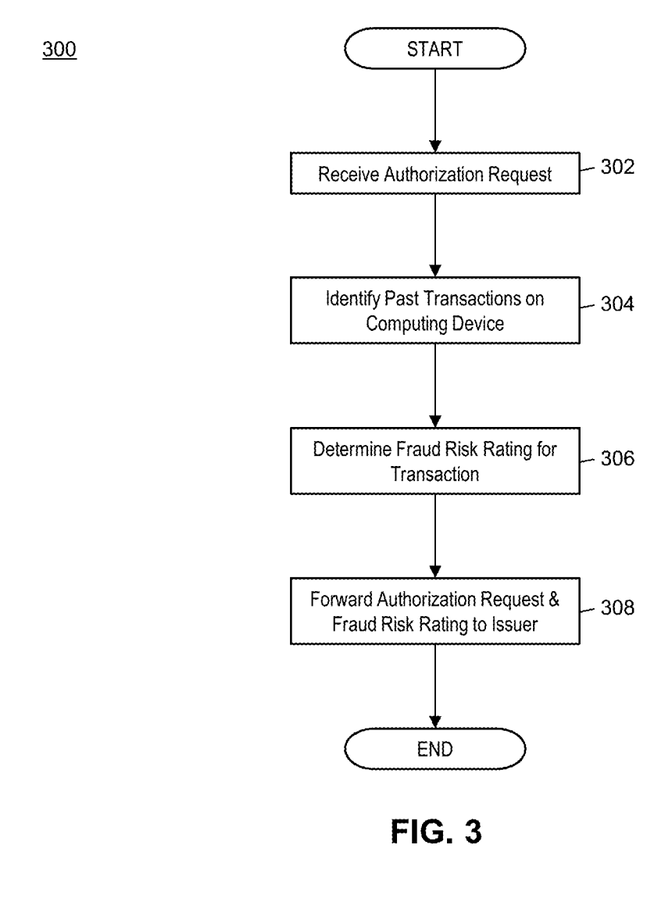
FIG. 3 is a flow diagram illustrating a process for the identifying a fraud risk rating for a payment transaction using the processing server of FIG. 2 in accordance with exemplary embodiments.

FIG. 3 illustrates a process 300 for the determination of a fraud risk rating for a payment transaction initiated via a computing device 104 that is based on usage of the computing device 104 in additional payment transactions.

In step 302, the receiving device 202 of the processing server 102 may receive an authorization request for a payment transaction, such as via the payment rails associated with the payment network 112. The authorization request may be a transaction message that is formatted pursuant to one or more standards, such as the ISO 8583 or ISO 20022 standards, that includes a message type indicator indicative of an authorization request. The authorization request may include a plurality of data elements including at least a first data element configured to store a device identifier associated with the computing device 104 used to initiate the payment transaction, a second data element configured to store a primary account number associated with a transaction account to be used to fund the payment transaction, and one or more additional data elements configured to store additional transaction data.

In step 304, the querying module 210 of the processing server 102 may execute a query on the transaction database 206 to identify a plurality of transaction data entries 208 related to payment transactions that involved the same computing device 104. The transaction data entries 208 may each include a device identifier that corresponds to the device identifier stored in the first data element included in the received authorization request. In some instances, the generation module 214 of the processing server 102 may first generate a tokenized value using the device identifier parsed from the authorization request, which may be used to identify the transaction data entries 208.

In step 306, the determination module 212 of the processing server 102 may determine a fraud risk rating for the payment transaction. The fraud risk rating may be determined based on at least the number of unique account identifiers included in the identified transaction data entries 208. In some instances, the determination may also be based on the transaction date and/or time included in each of the identified transaction data entries 208. For example, the determined risk rating may be based on the number of unique account identifiers used in payment transactions initiated via the computing device 104 during a predetermined period of time, which may be a predetermined period of time that includes the present time or a date and/or time of the received authorization request. In some embodiments, the determined fraud risk rating may also be based on additional fraud considerations, such as the merchant industry, transaction amount, geographic location, etc.

In step 308, the transmitting device 216 of the processing server 102 may electronically transmit the authorization request and determined fraud risk rating to the issuing institution 108 associated with the transaction account used in the payment transaction. In some embodiments, the querying module 210 may execute a query to insert the fraud risk rating into a corresponding data element included in the authorization request prior to forwarding. In other embodiments, the transmitting device 216 may electronically transmit separate data signals to the issuing institution 108. In still other embodiments, the transmitting device 216 may electronically transmit a single data signal to the issuing institution 108 that includes both the authorization request and the separate fraud risk rating. The issuing institution 108 may then authorize or decline the payment transaction based on at least the determined fraud risk rating.

Exemplary Method for Fraud Modeling Based on Shared Computing Device Usage

Figure 4:
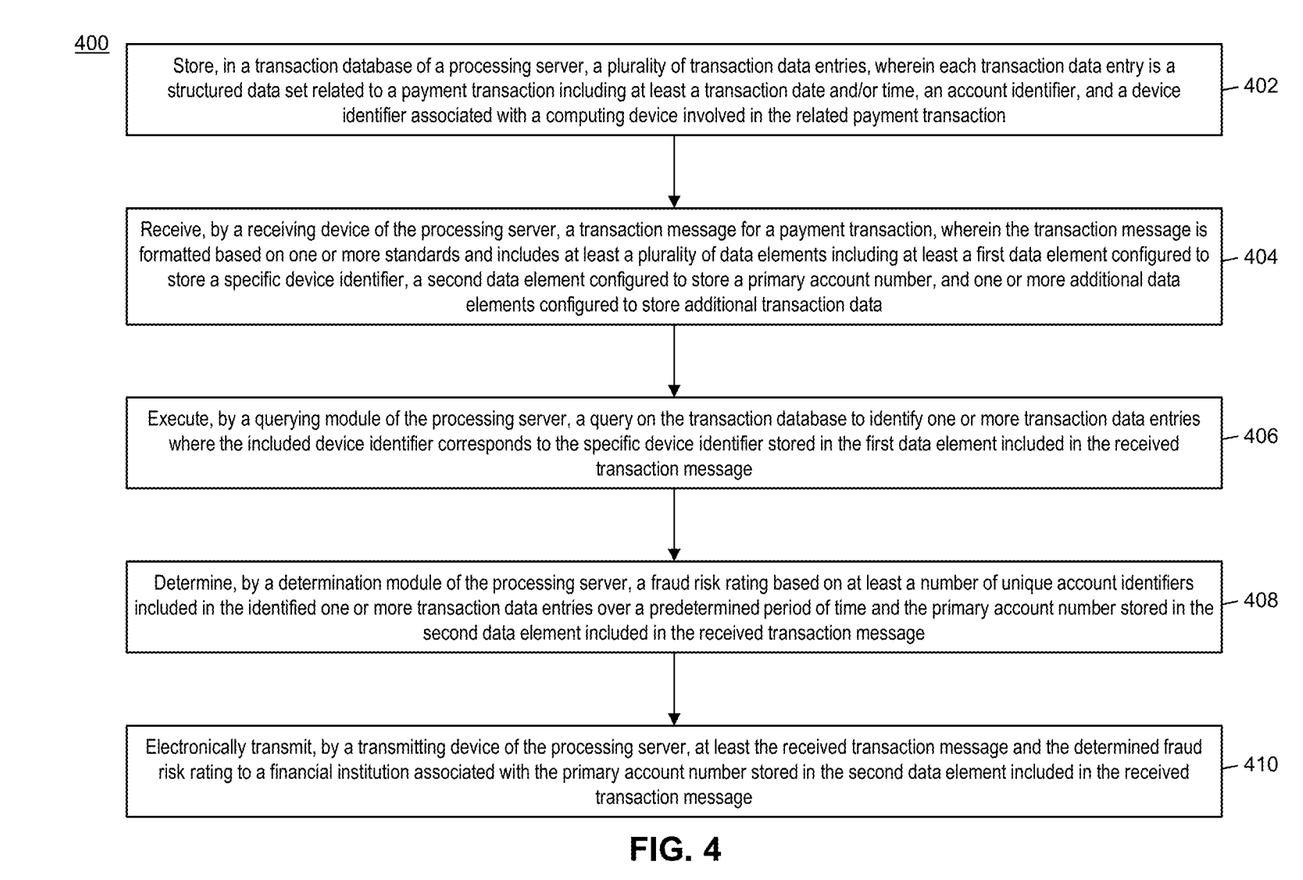
FIG. 4 is a flow chart illustrating an exemplary method for fraud modeling based on shared computing device usage in accordance with exemplary embodiments.

FIG. 4 illustrates a method 400 for the use of fraud modeling to determine a fraud risk rating for a payment transaction based on the shared usage of a computing device involved in the payment transaction.

In step 402, a plurality of transaction data entries (e.g., the transaction data entries 208) may be stored in a transaction database (e.g., the transaction database 206) of a processing server (e.g., the processing server 102), wherein each transaction data entry is a structured data set related to a payment transaction including at least a transaction date and/or time, an account identifier, and a device identifier associated with a computing device (e.g., the computing device 104) involved in the related payment transaction. In step 404, a transaction message may be received by a receiving device (e.g., the receiving device 202) of the processing server for a payment transaction, wherein the transaction message is formatted based on one or more standards and includes at least a plurality of data elements including at least a first data element configured to store a specific device identifier, a second data element configured to store a primary account number, and one or more additional data elements configured to store additional transaction data.

In step 406, a query may be executed on the transaction database by a querying module (e.g., the querying module 210) of the processing server to identify one or more transaction data entries where the included device identifier corresponds to the specific device identifier stored in the first data element included in the received transaction message. In step 408, a fraud risk rating may be determined by a determination module (e.g., the determination module 212) of the processing server based on at least a number of unique account identifiers included in the identified one or more transaction data entries over a predetermined period of time and the primary account number stored in the second data element included in the received transaction message. In step 410, at least the received transaction message and the determined fraud risk rating may be electronically transmitted by a transmitting device (e.g., the transmitting device 216) of the processing server to a financial institution (e.g., issuing institution 108) associated with the primary account number stored in the second data element included in the received transaction message.

In some embodiments, the method 400 may further include executing, by the querying module of the processing server, a query on the transaction message to store the determined fraud risk rating in a corresponding data element of the plurality of data elements, wherein transmitting the received transaction message and determined fraud risk rating to the financial institution includes transmitting the transaction message including the fraud risk rating stored in the corresponding data element. In one embodiment, the plurality of data elements may further include a third data element configured to store a transaction date and a fourth data element configured to store a transaction time, and the predetermined period of time may be based on the transaction date and/or transaction time.

In some embodiments, the method 400 may also include generating, by a generation module (e.g., the generation module 214) of the processing server, a tokenized representation of the specific device identifier, wherein the device identifier included in each of the identified one or more transaction data entries is equivalent to the tokenized representation. In a further embodiment, the tokenized representation may be generated via encrypting the specific device identifier using a predetermined encryption algorithm. In another further embodiment, generating the tokenized representation may include executing, by the querying module of the processing server, a query on a look-up table to identify the tokenized representation as being associated with the specific device identifier.

In one embodiment, the fraud risk rating may be further based on the additional transaction data stored in the one or more additional data elements included in the received transaction message. In a further embodiment, the additional transaction data may include at least one of: a transaction amount, a merchant category code, a merchant identifier, a geographic location, a transaction time, and a transaction date. In some embodiment, the method 400 may further include executing, by the querying module of the processing server, a query on the transaction database to insert a new transaction data entry including at least the primary account number and specific device identifier included in the received transaction message and a date and/or time. In one embodiment, the specific device identifier may be a media access control address.

Payment Transaction Processing System and Process

Figure 5:
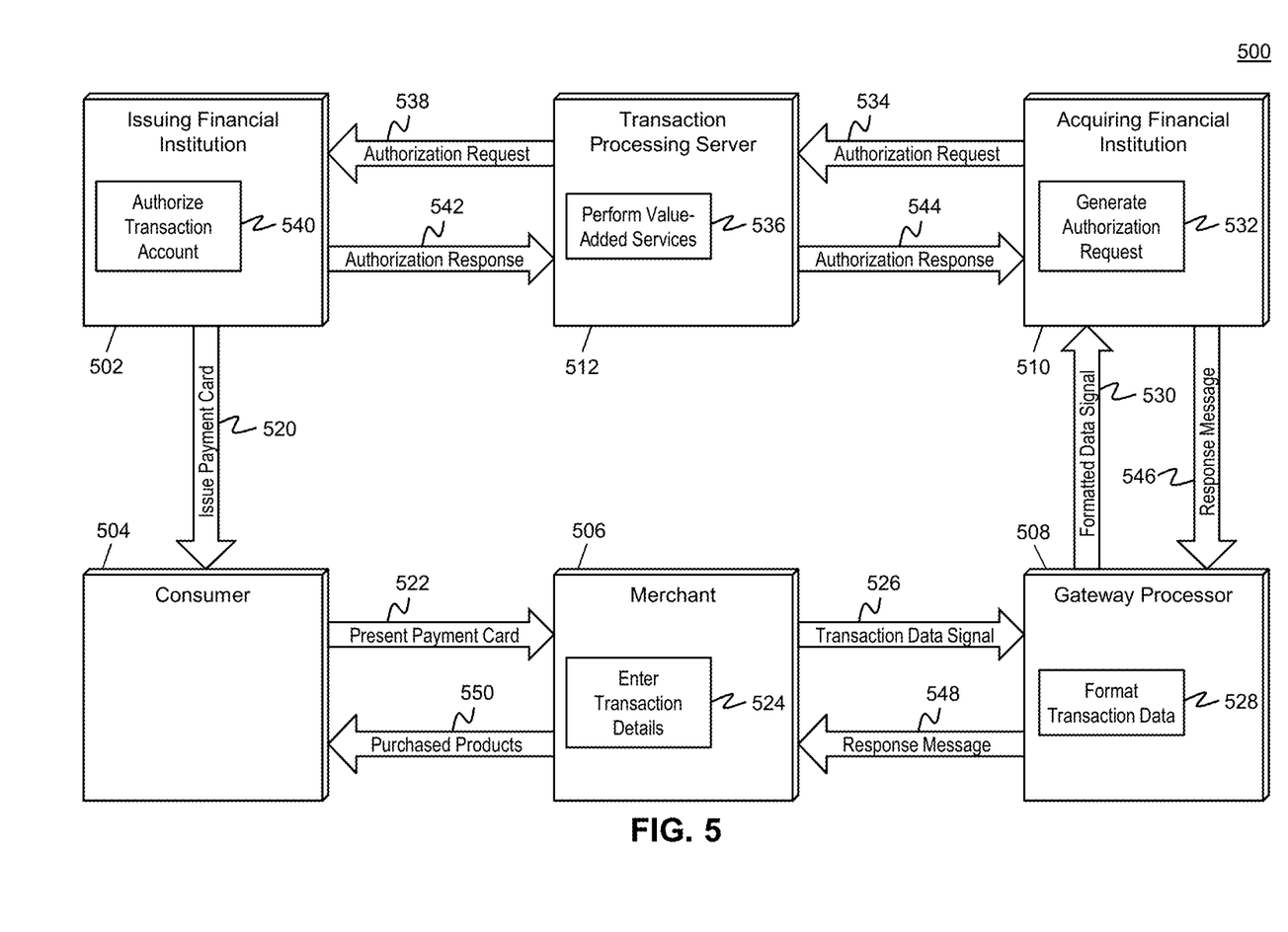
FIG. 5 is a flow diagram illustrating the processing of a payment transaction in accordance with exemplary embodiments.

FIG. 5 illustrates a transaction processing system and a process 500 for the processing of payment transactions in the system, which may include the processing of thousands, millions, or even billions of transactions during a given period (e.g., hourly, daily, weekly, etc.). The process 500 and steps included therein may be performed by one or more components of the system 100 discussed above, such as the processing server 102, computing device 104, consumer 106, issuing institution 108, merchant system 110, payment network 112, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3 and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
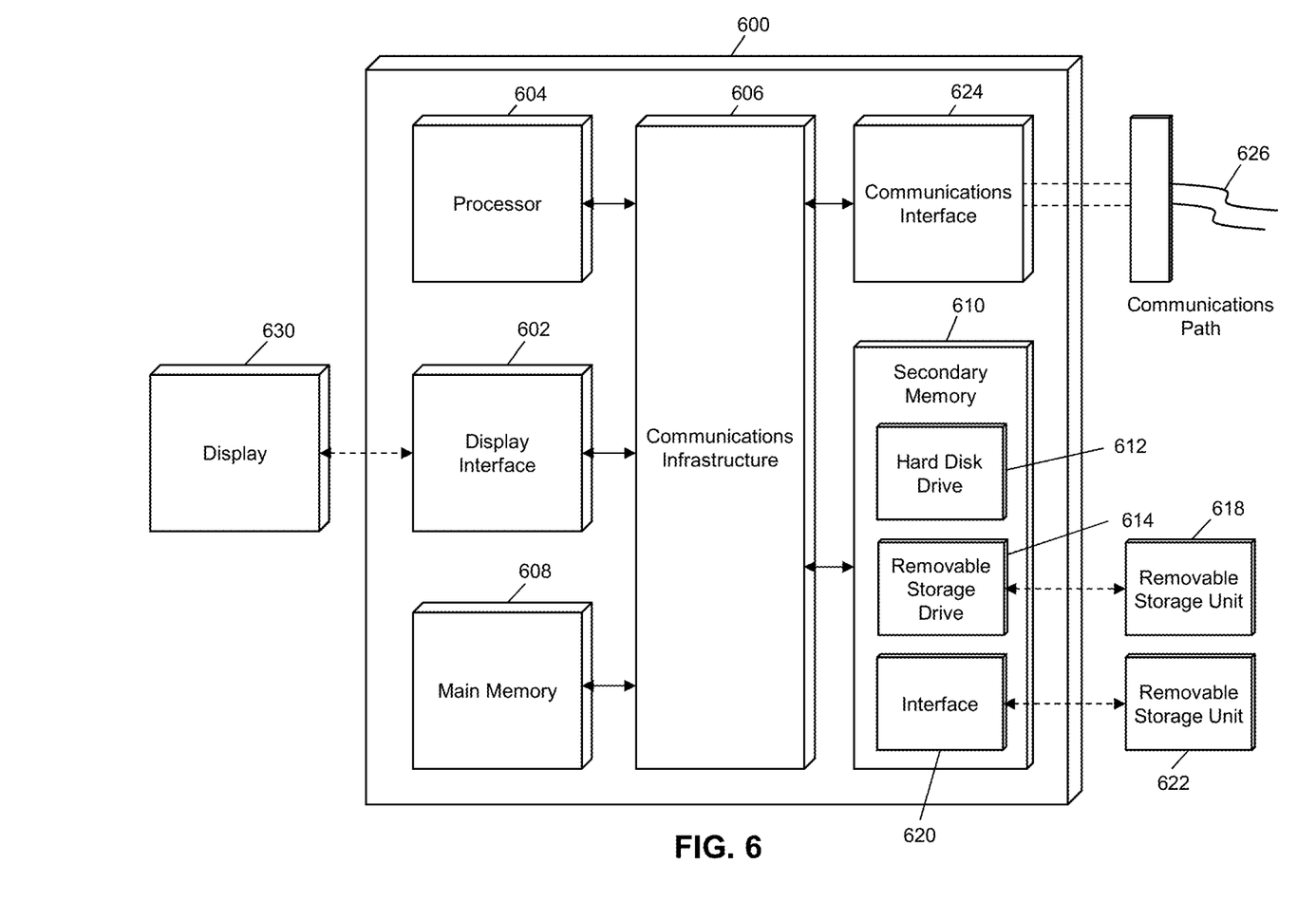
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for fraud modeling based on shared computing device usage. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for fraud modeling based on shared computing device usage, comprising:
   storing, in a transaction database of a processing server, a plurality of transaction data entries, wherein each transaction data entry is a structured data set related to a payment transaction including at least a transaction date and/or time, an account identifier, and a device identifier associated with a computing device involved in the related payment transaction;
   receiving, by a receiving device of the processing server, a transaction message for a payment transaction, wherein the transaction message is formatted based on one or more standards and includes at least a plurality of data elements including at least a first data element configured to store a specific device identifier, a second data element configured to store a primary account number, and one or more additional data elements configured to store additional transaction data;
   executing, by a querying module of the processing server, a query on the transaction database to identify one or more transaction data entries where the included device identifier corresponds to the specific device identifier stored in the first data element included in the received transaction message;
   determining, by a determination module of the processing server, a fraud risk rating based on at least a number of a plurality of different account identifiers included in the identified one or more transaction data entries where the included device identifier corresponds to the specific device identifier over a predetermined period of time and the primary account number stored in the second data element included in the received transaction message; and
   electronically transmitting, by a transmitting device of the processing server, at least the received transaction message and the determined fraud risk rating to a financial institution associated with the primary account number stored in the second data element included in the received transaction message, wherein the transmitting comprises cycling through communication channels to alleviate network congestion.

2. The method of claim 1, further comprising:
   executing, by the querying module of the processing server, a query on the transaction message to store the determined fraud risk rating in a corresponding data element of the plurality of data elements, wherein
   transmitting the received transaction message and determined fraud risk rating to the financial institution includes transmitting the transaction message including the fraud risk rating stored in the corresponding data element.

3. The method of claim 1, further comprising:
   generating, by a generation module of the processing server, a tokenized representation of the specific device identifier, wherein
   the device identifier included in each of the identified one or more transaction data entries is equivalent to the tokenized representation.

4. The method of claim 3, wherein the tokenized representation is generated via encrypting the specific device identifier using a predetermined encryption algorithm.

5. The method of claim 3, wherein generating the tokenized representation includes executing, by the querying module of the processing server, a query on a look-up table to identify the tokenized representation as being associated with the specific device identifier.

6. The method of claim 1, wherein
the plurality of data elements further includes a third data element configured to store a transaction date and a fourth data element configured to store a transaction time, and
the predetermined period of time is based on the transaction date and/or transaction time.

7. The method of claim 1, wherein the fraud risk rating is further based on the additional transaction data stored in the one or more additional data elements included in the received transaction message.

8. The method of claim 7, wherein the additional transaction data includes at least one of: a transaction amount, a merchant category code, a merchant identifier, a geographic location, a transaction time, and a transaction date.

9. The method of claim 1, further comprising:
executing, by the querying module of the processing server, a query on the transaction database to insert a new transaction data entry including at least the primary account number and specific device identifier included in the received transaction message and a date and/or time.

10. The method of claim 1, wherein the specific device identifier is a media access control address.

11. A system for fraud modeling based on shared computing device usage, comprising:
a transaction database of a processing server configured to store a plurality of transaction data entries, wherein each transaction data entry is a structured data set related to a payment transaction including at least a transaction date and/or time, an account identifier, and a device identifier associated with a computing device involved in the related payment transaction;
a receiving device of the processing server configured to receive a transaction message for a payment transaction, wherein the transaction message is formatted based on one or more standards and includes at least a plurality of data elements including at least a first data element configured to store a specific device identifier, a second data element configured to store a primary account number, and one or more additional data elements configured to store additional transaction data;
a querying module of the processing server configured to execute a query on the transaction database to identify one or more transaction data entries where the included device identifier corresponds to the specific device identifier stored in the first data element included in the received transaction message;
a determination module of the processing server configured to determine a fraud risk rating based on at least a number of a plurality of different account identifiers included in the identified one or more transaction data entries where the included device identifier corresponds to the specific device identifier over a predetermined period of time and the primary account number stored in the second data element included in the received transaction message; and a transmitting device of the processing server configured to electronically transmit at least the received transaction message and the determined fraud risk rating to a financial institution associated with the primary account number stored in the second data element included in the received transaction message, wherein the transmission comprises cycling through communication channels to alleviate network congestion.

12. The system of claim 11, wherein
the querying module of the processing server is further configured to execute a query on the transaction message to store the determined fraud risk rating in a corresponding data element of the plurality of data elements, and
transmitting the received transaction message and determined fraud risk rating to the financial institution includes transmitting the transaction message including the fraud risk rating stored in the corresponding data element.

13. The system of claim 11, further comprising:
a generation module of the processing server configured to generate a tokenized representation of the specific device identifier, wherein
the device identifier included in each of the identified one or more transaction data entries is equivalent to the tokenized representation.

14. The system of claim 13, wherein the tokenized representation is generated via encrypting the specific device identifier using a predetermined encryption algorithm.

15. The system of claim 13, wherein generating the tokenized representation includes executing, by the querying module of the processing server, a query on a look-up table to identify the tokenized representation as being associated with the specific device identifier.

16. The system of claim 11, wherein
the plurality of data elements further includes a third data element configured to store a transaction date and a fourth data element configured to store a transaction time, and
the predetermined period of time is based on the transaction date and/or transaction time.

17. The system of claim 11, wherein the fraud risk rating is further based on the additional transaction data stored in the one or more additional data elements included in the received transaction message.

18. The system of claim 17, wherein the additional transaction data includes at least one of: a transaction amount, a merchant category code, a merchant identifier, a geographic location, a transaction time, and a transaction date.

19. The system of claim 11, wherein the querying module of the processing server is further configured to execute a query on the transaction database to insert a new transaction data entry including at least the primary account number and specific device identifier included in the received transaction message and a date and/or time.

20. The system of claim 11, wherein the specific device identifier is a media access control address.

* * * * *